(12) United States Patent
Tsutsui et al.

(10) Patent No.: US 6,220,402 B1
(45) Date of Patent: Apr. 24, 2001

(54) HYDRAULIC SERVO APPARATUS FOR AUTOMATIC TRANSMISSION

(75) Inventors: Hiroshi Tsutsui; Kazumasa Tsukamoto; Masaaki Nishida; Yoshihisa Yamamoto; Akitomo Suzuki; Akihito Iwata; Akira Isogai, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/261,489

(22) Filed: Mar. 3, 1999

(30) Foreign Application Priority Data

Mar. 10, 1998 (JP) .................................. 10-075036

(51) Int. Cl.⁷ .................................... F16D 51/00
(52) U.S. Cl. .................... 188/77 W; 188/77 R; 188/347
(58) Field of Search ................. 188/77 W, 77 R, 188/151 R, 152, 347, 348, 365, 366; 192/17 A; 92/109, 110, 111, 112

(56) References Cited

U.S. PATENT DOCUMENTS 2,633,712 * 4/1953 Sheppard .................. 188/151 R
2,858,804 * 11/1958 Banker ........................ 91/422
3,450,005 * 6/1969 Ellis ........................ 91/189 R
4,881,453 * 11/1989 Armstrong ................. 188/77 R
5,806,405 * 9/1998 Premiski et al. ............... 92/110

* cited by examiner

Primary Examiner—Matthew C. Graham
Assistant Examiner—Mariano Sy
(74) Attorney, Agent, or Firm—Lorusso & Loud

(57) ABSTRACT

A hydraulic servo includes a cylinder, a piston and a rod. The piston divides the interior space of the cylinder between a closed hydraulic chamber and a back chamber which has an opening to the interior space of an automatic transmission. The rod is slidably mounted in the piston for relative movement through a predetermined distance. A frictional engagement element is engaged by the rod which is extended from one end of the cylinder by applying a hydraulic pressure to the hydraulic chamber. A passage is provided between the piston and the rod which is opened or closed by the relative movement between the piston and rod so that the hydraulic chamber and the back chamber are connected or disconnected. A valving arrangement ("closer") closes the passage at the end of the return stroke of the piston toward the hydraulic chamber.

12 Claims, 6 Drawing Sheets

HYDRAULIC SERVO APPARATUS FOR AUTOMATIC TRANSMISSION

BACKGROUND OF THE INVENTION

1. Field of the Invention

The invention relates to a hydraulic servo apparatus which seperates frictional engagement elements for an automatic transmission. More specifically, it relates to exhaust of air from a hydraulic chamber.

2. Description of the Related Art

A band brake is one type of a frictional engagement element provided for fixing a particular shift element, e.g. a sun gear, a carrier, or a ring gear, to a transmission case for achieving a certain speed ratio in an automotive transmission. In a conventional automatic transmission, the hydraulic servo apparatus, which operates to engage/disengage the brake band to/from the drum, is a piston/cylinder mechanism. The band is operated on by the movement of a rod interlocked to the piston. The rod is moved with the piston by a hydraulic pressure applied to the piston to engage or release the brake. Such a hydraulic servo is ordinarily arranged in an upper portion of the automatic transmission case.

One problem associated with the above-described type hydraulic servo is that fine bubbles tend to become entrapped in the automatic transmission fluid and are prone to accumulate in the hydraulic servo. Because of air accumulated in the hydraulic servo, a rise in pressure to the hydraulic servo is dampened and pressure responsiveness of the hydraulic servo apparatus is reduced. The timing of engagement of the band brake may become displaced from the proper timing. As a proposed solution to the foregoing problem, Japanese utility publication No. 60-99336 teaches provision of an air passage in the rod so that the air backlogged in the cylinder is exhausted by the piston stroke.

However, in the conventional automatic transmission, the piston and the rod move integrally. Therefore, upon a return stroke, air is sucked into the cylinder through the air passage, i.e. reintroduced. Therefore, a volume of air must be exhausted from the cylinder by each piston stroke, and the stroke time for exhausting the air is lengthy, i.e. the degree of opening of the air passage is determined by the movement of the rod which, in turn, depends on the stroke time. A long stroke time is required for sufficiently exhausting the air. In the case of a long stroke time, the rod of the hydraulic servo operating the brake has to be moved through a long stroke when the brake is fastened. Therefore, responsiveness in brake engagement is diminished.

SUMMARY OF THE INVENTION

In view of the above problems associated with the related art, a first object of the invention is to provide a hydraulic servo apparatus for an automatic transmission which exhausts air from a hydraulic servo, thereby preventing loss of responsiveness in the engagement of a frictional engagement element, and which prevents air from reentering the hydraulic chamber of the hydraulic servo in the return stroke of the piston.

A second object of the invention is to provide a proper stroke timing for exhausting air from the hydraulic servo, using a simple structure.

A third object of the invention is to provide a proper timing for exhausting air in a stroke of the piston, again by provision of a simple structure.

A fourth object of the invention is to utilize the rod to prevent air from reentering the hydraulic chamber of the hydraulic servo during the return stroke of the piston and rod.

A fifth object of the invention is to utilize the piston to prevent air from reentering the hydraulic chamber of the hydraulic servo during the return stroke of the piston and rod.

A sixth object of the invention is to prevent a loss of a hydraulic pressure after establishing engagement of the frictional engagement element, utilizing stroke of the rod for exhausting air from the hydraulic chamber.

A seventh object of the invention is to provide for exhaust of air from a hydraulic chamber without loss of responsiveness during the fastening operation (engagement) of a frictional engagement element by making it possible to exhaust the air within a short period of time in which the rod and the piston slide relative to each other.

A eighth object of the invention is to provide an absolutely reliable exhaust of volumes of air accumulating in a hydraulic chamber.

In order to achieve the aforementioned objects, the present invention provides a hydraulic servo apparatus for an automatic transmission which includes a cylinder having an interior space which, at one end, is in communication with the interior space of the automatic transmission. A piston is slidably mounted in the cylinder and divides the interior space of the cylinder into a closed hydraulic chamber and a back chamber open to the surrounding, interior space within the automatic transmission. A rod is slidably inserted in the piston so that the piston and the rod can move relative to each other over a predetermined distance. A passage is formed between the piston and the rod and connects/disconnects the closed hydraulic chamber to the back chamber by the relative movement between the piston and the rod. A closer closes the passage at the end of the return stroke of the piston toward the hydraulic chamber side. In this hydraulic servo apparatus, the piston is moved toward the back chamber side by applying a hydraulic pressure to the hydraulic chamber, whereby the rod is extended from the one end of the cylinder and pushes against a frictional engagement element by the movement of the piston.

The hydraulic servo apparatus further includes a return spring which is mounted in the back chamber and returns the piston and a regulating spring which is arranged between the piston and the rod and regulates the relative movement between the piston and rod. In the hydraulic servo, timing of the relative movement between the piston and the rod is determined in part by (depends on) the difference between the loads of the return spring and the regulating spring.

The timing of the opening/closing of the passage connecting the two chambers of the cylinder, by the relative movement between the piston and the rod, is determined in part by the shape of the passage.

In one embodiment, the rod provides a contact face which comes into sealing contact with a hydraulic chamber end face at the end of the return stroke of the piston toward the hydraulic chamber side. The passage connecting the two chambers of the cylinder is closed by the sealing contact between the contact face and the hydraulic chamber end face.

A seal member may also be provided on the hydraulic chamber end face for contact with the piston at the completion of the return stroke of the piston toward the hydraulic chamber side.

In one embodiment of the hydraulic servo apparatus of the present invention, the passage is formed in the rod, one end of the passage is opened at the end face of the rod, the other end of the passage is opened at a point on the periphery of the rod, with these two spaced openings being opened/closed by the relative movement between the rod and the piston.

Optionally, the passage formed in the rod may have two spaced peripheral openings which are open at same time. Alternatively, the passage which is formed in the rod has one end which is opened/closed by the relative movement between the piston and the rod, with the other end of the passage remaining open to the back chamber at all times.

According to the present invention, the air in the hydraulic chamber is exhausted through the passage formed between the piston and the rod at a proper piston/rod stroke timing, and return of the air into the hydraulic chamber during the return stroke of the piston is prevented by the closer which closes the passage at the end of the return stroke of the piston toward the hydraulic chamber side. Therefore, residual air accumulated in the hydraulic chamber, which would adversely affect response in engagement of the frictional engagement element, is minimized.

The timing of the relative movement between the piston and the rod is determined by load settings of the return spring and the regulating spring. Therefore, the short time needed for exhausting the air is obtained, without a long stroke time of the rod, in a simple structure.

The timing or duration of fluid communication between the hydraulic chamber and the back chamber through the passage is determined by the shape and length of the passage and the stroke of the piston and the rod.

In one preferred embodiment the passage for exhausting the air is closed by contact between the contact portion of the rod and the end face of the hydraulic chamber. Therefore, reentry of the air into the hydraulic chamber due to the return stroke of the piston is prevented by the rod, and reentry of the air into the hydraulic chamber is prevented entirely.

The "closer" is the seal which contacts the piston at the completion of the return stroke of the piston toward the hydraulic chamber side. Therefore, the air does not reenter through the passage between the piston and the rod, and the amount of accumulated air in the hydraulic chamber is minimized.

Sufficient time for exhausting the air is allowed for during the stroke of the piston and the rod and, therefore, the air in the hydraulic chamber is completely exhausted.

The time required for exhausting the air is that short period of time in which the rod and the piston move relative to each other. Therefore, it is possible to exhaust the air from the hydraulic chamber without diminishing the responsiveness of the hydraulic servo during the operation of fastening (engaging) the frictional engagement element.

The air is exhausted continuously, even with the frictional engagement element in the fastened state. Therefore, the possibility that a volume of air might accumulate in the hydraulic chamber is eliminated.

BRIEF DESCRIPTION OF THE DRAWINGS

The invention will be further described in conjunction with the accompanying drawings in which like features are designated with like reference characters, and wherein.

DETAILED DESCRIPTION OF THE INVENTION

Figure 1:
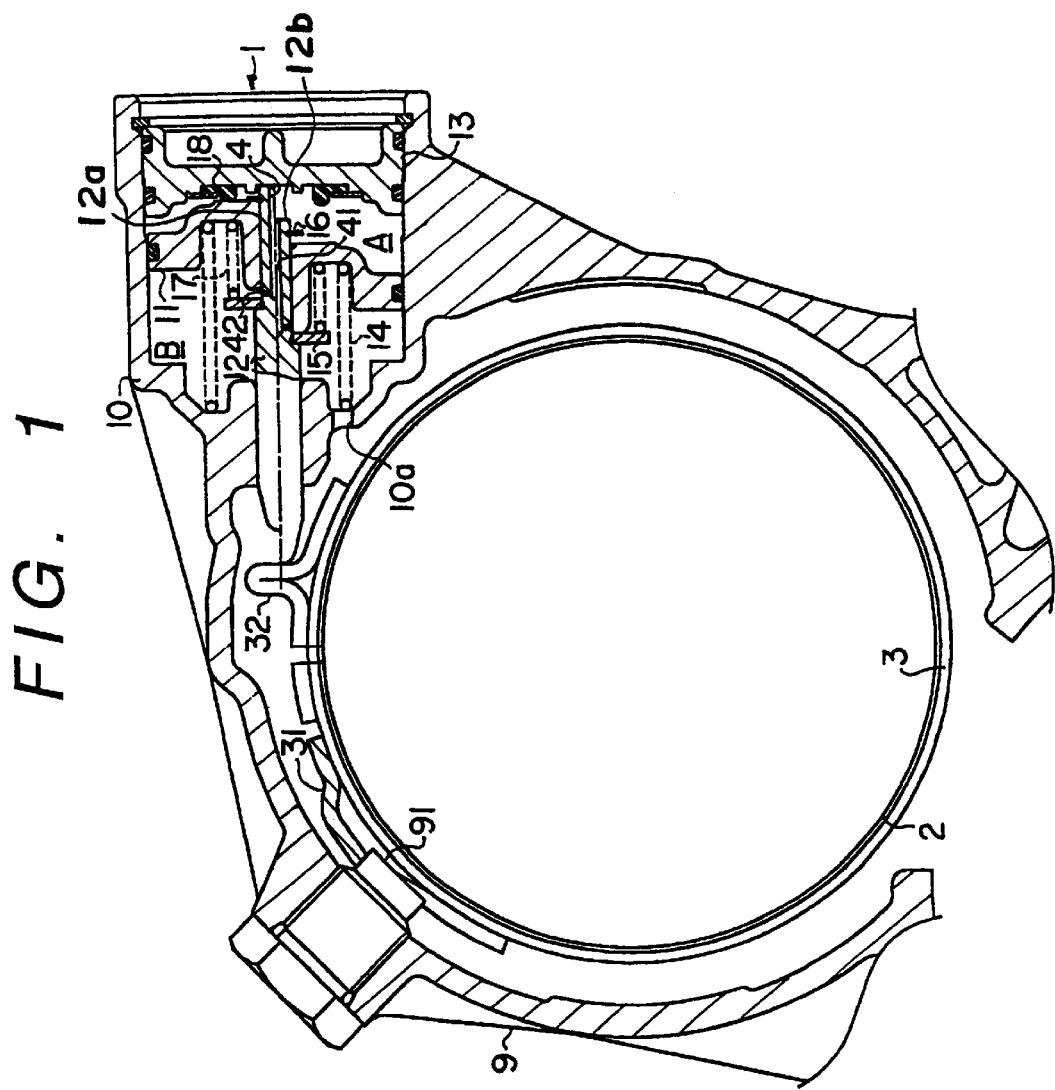
FIG. 1 is a cross section of a hydraulic servo for use in an automatic transmission according to a first embodiment of the invention.

Preferred embodiments will now be described with reference to the accompanying drawings. FIG. 1 through FIG. 4 show the first embodiment of the invention. As shown in FIG. 1, the hydraulic servo apparatus of the first embodiment comprises a drum 2 which serves as an engagement element of a band brake, a band 3 fastened to the drum 2, and a hydraulic servo apparatus 1.

The drum 2 of the band brake is connected to a shift element such as a sun gear, a ring gear or a carrier of plural planetary gear units in an automatic transmission gear train so that the shift element serves as a reaction element in fixing the shift element to automatic transmission case 9 during a shift. The band 3 extends almost completely around the drum 2 and has, fixed thereto, an anchor side bracket 31 and an apply side bracket 32. The anchor side bracket 31 is arranged at one end of the band 3 and is fixed in position by contact with an anchor bolt 91 screwed into the automatic transmission case 9. The apply side bracket 32 is fixed to the other end of the band 3 and has the form of a sharp bend extending as a protrusion from the circumference of the band 3 and presenting a radially extending flat surface facing the hydraulic servo 1 which is arranged within the automatic transmission case 9.

In this embodiment, the hydraulic servo apparatus 1 comprises a cylinder 10 integrated with the automatic transmission case 9, a piston 11 slidably inserted in the cylinder 10 and circumferentially sealed with the cylinder 10 through an O-ring. A rod 12 is slidably inserted in the piston 11. The cylinder 10 is cylindrical in shape with a closed bottom 10b and is connected to the interior space of the automatic transmission through a hole 10a in bottom 10b. The open end side of the cylinder 10 is sealed oil-tightly with a cover 13 inserted in the cylinder 10 and fixed with a snap ring. The cover 13 is sealed with the cylinder 10 through O-rings around its periphery.

The piston 11 divides the interior space of the cylinder 10 into a hydraulic chamber A between the piston 11 and the cover 13 and a back chamber B between the piston 11 and the bottom 10b of the cylinder 10. An outer spring 14 serves as a return spring and is loaded to a predetermined extent. As shown in FIG. 1 outer spring 14 is arranged between the piston 11 and the bottom 10b of the cylinder 10.

The rod 12 is a stepped shaft having large and small diameter portions. The large diameter portion 12b extends through the bottom 10b of the cylinder 10. The small diameter portion 12a is inserted in a center hole in the piston 11. The rod 12 is slidably supported in the cylinder 10 through the piston 11. A spring seat 15 is fit around small diameter portion 12a abutting the step formed between the small diameter portion 12a and the large diameter portion 12b of the rod 12. A snap ring 16 is fit on the small diameter portion 12a, near its distal end, to secure the piston 11 thereon. An inner spring 17, which serves as a regulating spring, is arranged between the spring seat 15 and the piston 11. The inner spring 17 provides a predetermined early phase load. The piston 11 is able to slide on small diameter portion 12a between the snap ring 16 and the spring seat 15. The distal end of the large diameter portion 12b of the rod 12 extends through the cylinder bottom 10b, has a spherical shape and engages the apply side bracket 32.

The relationship between the spring constants of the outer spring 14 and the inner spring 17 is such that the spring constant of the inner spring 17 is sufficiently larger than the spring constant of the outer spring 14 so that the relative movement between the rod 12 and the piston 11 occurs only after they complete a stroke wherein they move integrally together.

A passage 4, which is opened/closed by the relative movement between the piston 11 and the rod 12 for connecting/disconnecting fluid communication between the hydraulic chamber A and the back chamber B, is formed between the piston 11 and the rod 12. In this embodiment, the passage 4 is formed in the rod 12. The passage 4 includes an axial direction passage portion 41 and a radial direction passage portion 41a. One end of the axial direction passage portion 41 opens at the end face of the distal end of the small diameter portion 12a of the rod 12. One end of the radial direction passage portion 41a opens at the cylindrical surface of the small diameter portion 12a of the rod 12, at a point adjacent the spring seat 15. The opening of the radial direction passage portion 41a is opened/closed by the relatively movement between the rod 12 and the piston 11. The distal end of small diameter portion 12a comprises a contact portion 12c which presents an end face for contacting cover 13 at the completion of the return stroke of the piston 11. Therefore, the opening of the axial passage portion 41 is closed by the contact between the contact portion 12c and the end face of the cover 13.

Further, an auxiliary closer is provided for closing the passage 4 at the completion of the return stroke of the piston toward the hydraulic chamber A side. The auxiliary closer is arranged on the end face of the cover 13 and is a circular seal member 18 formed of an elastic such as a rubber. The seal member 18 contacts the piston 11 at the completion of the return stroke of the piston. The seal member 18 is fixed by a stop ring on the cover 13.

Figure 2A:
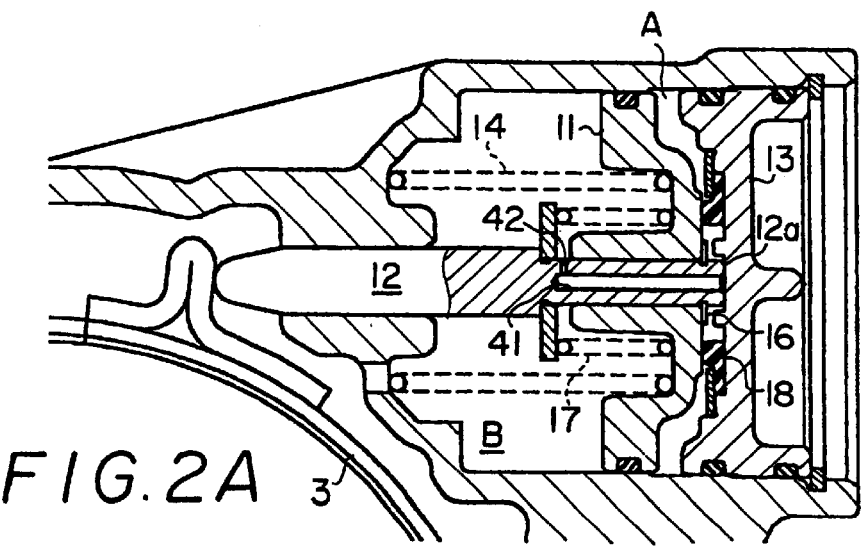
FIGS. 2A–2C are a sequence of figures showing operation of the hydraulic servo apparatus of the first embodiment.

The hydraulic servo apparatus 1 as described above is operated by applying a hydraulic pressure to the hydraulic chamber A. FIG. 2A shows the end position of the return stroke of the rod 12 and the piston 11, i.e. the position at completion of the return stroke. In this state, the piston 11 is held in its position by the load of the outer spring 14. The rod 12 is pushed to the right in the drawings, through the snap ring 16, by the piston 11 to the release position in which the distal end of rod portion 12a contacts the cover 13. Therefore, the piston 11 presses against the seal means 18 with a proper force, whereby a circular seal is formed around a peripheral area surrounding the rod 12 so that fluid communication between chambers A and B is interrupted. At this time, the inner spring 17 is not exerting its load because the load of the inner spring 17 is lower than the predetermined load. Therefore, the passage 4 is open at the opening of the radial direction passage portion 41a and closed at the opening of the axial direction passage portion 41. In this state, the hydraulic chamber A is isolated from the back chamber B by the double seal, i.e. by the contact between the cover 13 and the distal end of rod portion 12a and by the contact between the seal member 18 and the right end face of the piston 11. The apply side bracket 32 of band 3 remains in contact with the distal end of the rod portion 12b in the position shown in FIG. 2A.

Figure 2B:
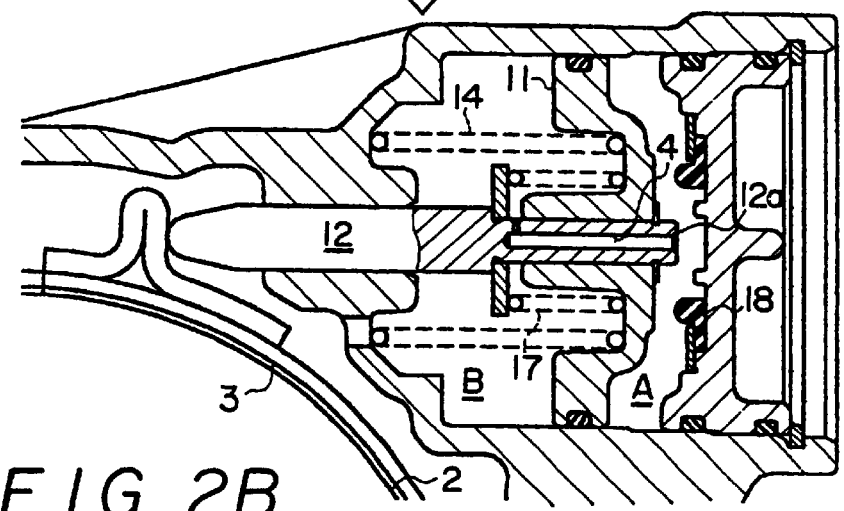

In this state, when the feed of hydraulic pressure is started to the hydraulic chamber A (apply pressure), as shown in FIG. 2B, the piston 11 starts to move against the load of the outer spring 14. The rod 12 moves substantially in tandem with the piston 11 (without relative movement therebetween) because of the load of the regulating spring 17. In this operation, the double seal is broken and the passage 4 connects the hydraulic chamber A and the back chamber B so that the air accumulated in the hydraulic chamber A is exhausted through the passage 4 to the back chamber B. This state is maintained until the clearance between the drum 2 and the band 3 is eliminated and further extension of the rod 12 is prevented.

Figure 2C:
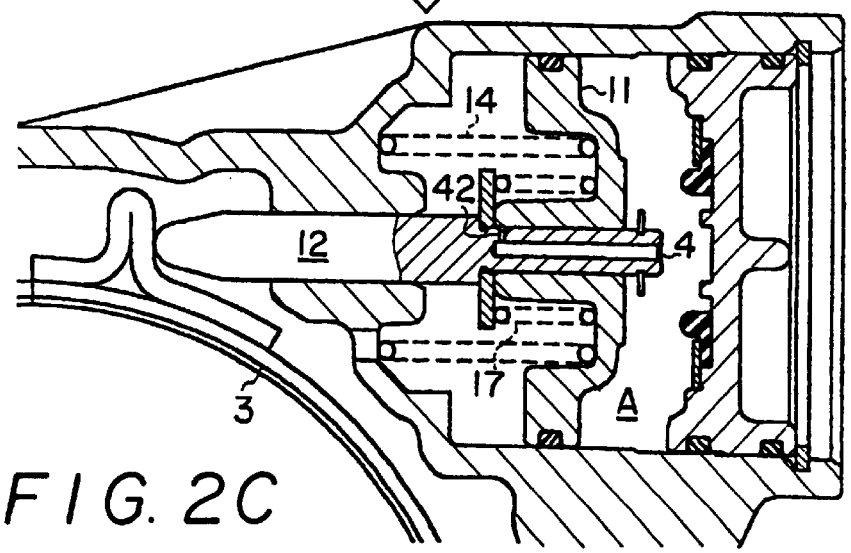

When the reaction force from the band 3 becomes greater than the load of the inner spring 17, as the brake band becomes fastened on the drum, the piston 11 moves against the load of the inner spring 17 and compresses it to the position shown in FIG. 2C. In this position the opening of the radial direction passage portion 41a is covered by the piston 11 so that the hydraulic chamber A and the back chamber B again become isolated from each other. Therefore, the loss of the hydraulic pressure applied to the hydraulic chamber A is prevented. In this operation, the fastening shock associated with the early phase of the brake fastening is absorbed by the inner spring 17., Thus, the force absorbed by the inner spring 17 is transferred through the piston 11 and the rod 12 to the band 3.

From the state shown in FIG. 2C, when the hydraulic pressure is drained from the hydraulic chamber A to release the brake, the passage 4 is opened during the return stroke of the piston 11 by the forces of the inner spring 17 and the outer spring 14. During the return stroke of the piston 11, the hydraulic fluid is pushed out of the hydraulic chamber A into the back chamber B. Therefore, the air in the back chamber can not enter the hydraulic chamber A. Thus, by the return stroke, the rod 12 and the piston 11, are returned to the upper range position shown in FIG. 2A. Therefore, the air once exhausted is prevented from reentering the hydraulic chamber A.

Figure 3:
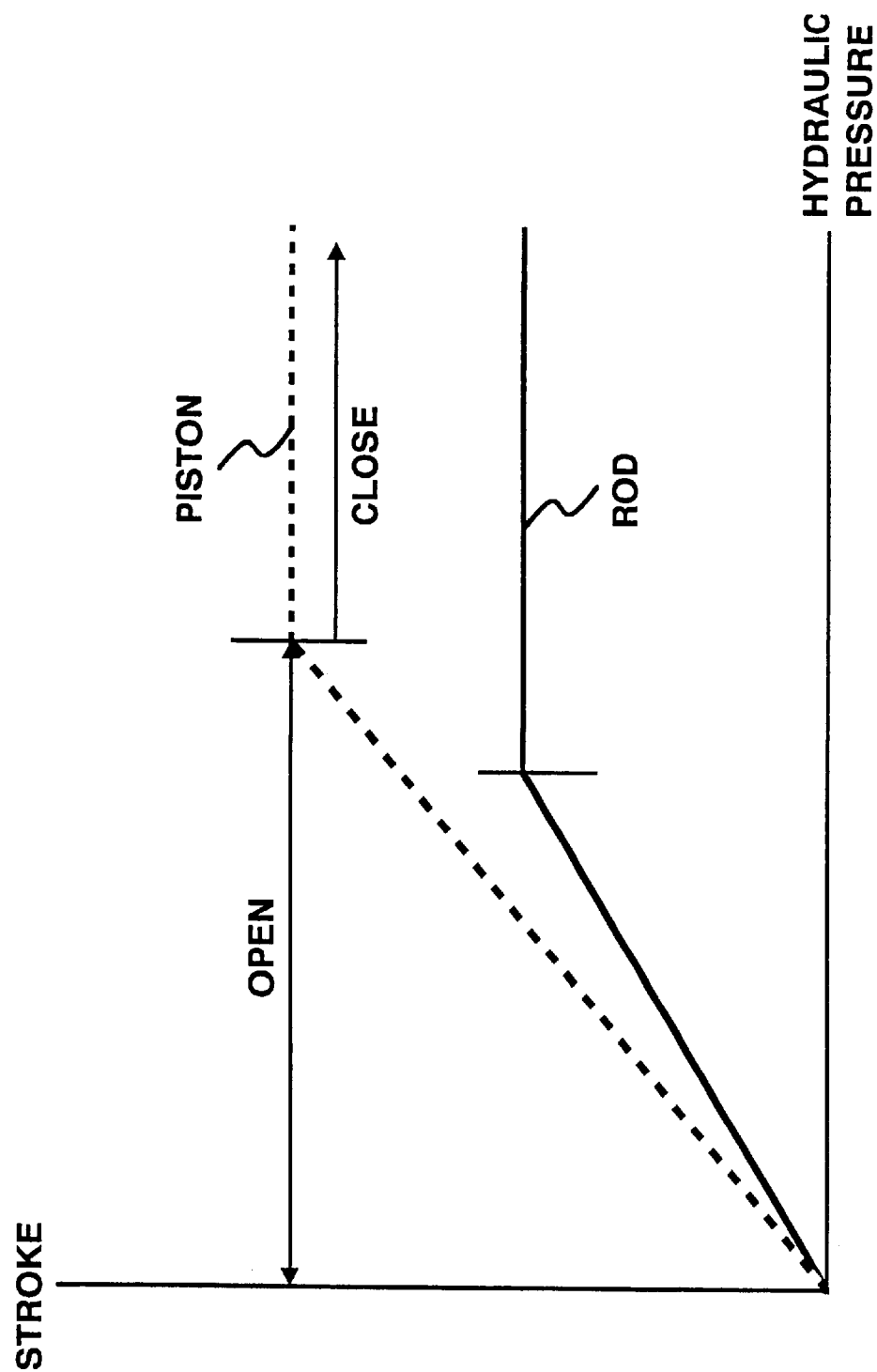
FIG. 3 is a graph of the relationship between an application hydraulic pressure and distance of piston stroke in the hydraulic servo of the first embodiment.

FIG. 3 shows the relationship between the stroke position of the rod 12 and the piston 11, the opening/closing of the passage 4 and the hydraulic (application) pressure. In this figure, the stroke of the rod 12 is represented by the continuous line and the stroke of the piston 11 is represented by the dotted line. The stroke of the rod 12 is shorter than the stroke of the piston 12. That is, the stroke of the rod 12 is stopped by the reaction force of the band 3. At that time, the stroke of the piston 12 continues until stopped by contact with the spring seat 15. The difference between these strokes is the relative movement. In this embodiment, the opening of the passage 4 is closed by the further stroke of the piston 11 (to the left in the drawings) after the completion of the stroke of the rod 12.

Figure 4:
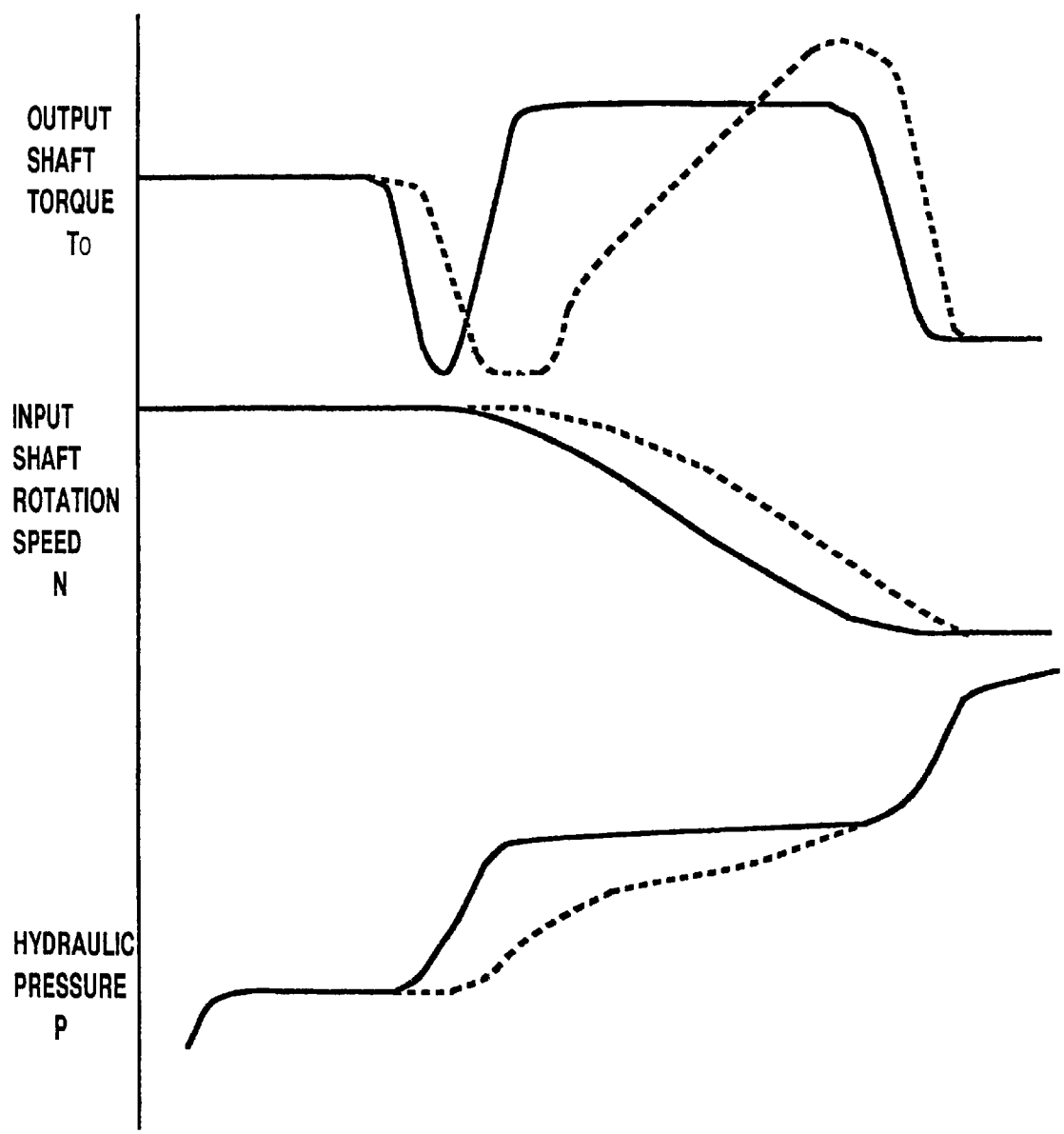
FIG. 4 is a graph of output shaft torque to, input shaft rotational speed N and hydraulic pressure P, comparatively showing characteristics of an automatic transmission incorporating the present invention and conventional characteristics.

FIG. 4 shows the characteristics of an upshift in the present invention compared with the conventional apparatus. In upshifting with the conventional apparatus, as shown with the dotted line, the rise of the brake pressure P is dampened because of the air in the hydraulic chamber A. In use of the apparatus of the present invention, as shown by the solid (continuous) line, the dampening is alleviated. Therefore, the input shaft rotational speed N more quickly makes the transition to the synchronized rotational speed after the shift.

In this embodiment, the passage 4 is closed by the relative movement between the piston 11 and the rod 12 so that the passage for exhausting the air is maintained open throughout the stroke of the rod 12. After exhausting the air, the passage 4 is closed by the movement of the piston 11 relative to the rod 12 so that the loss of the application pressure during fastening the brake is prevented. Because the passage 4 is formed within the rod 12, the hydraulic pressure during exhaust of the air is set with high accuracy, based on the spring load, by forming the diameter of the radial direction passage portion 42 with high accuracy.

Figure 5A:
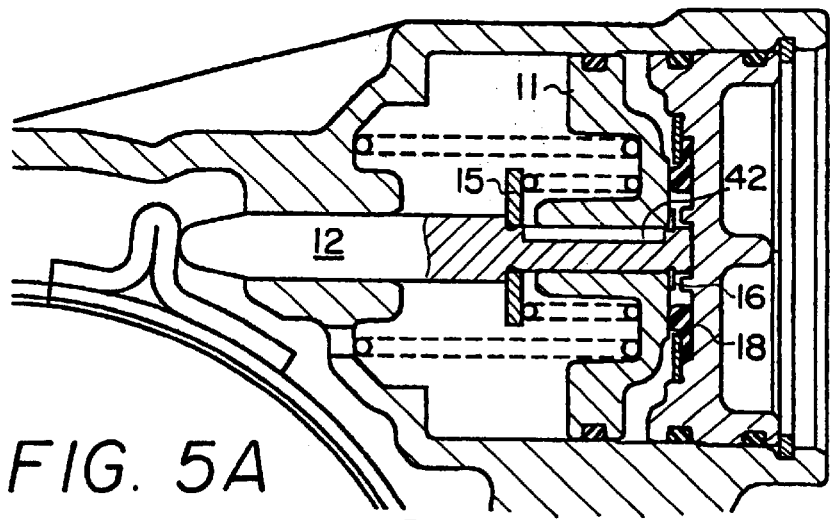
FIGS. 5A–5C are a sequence of figures showing operation of a hydraulic servo apparatus according to a second embodiment of the present invention.
Figure 5B:
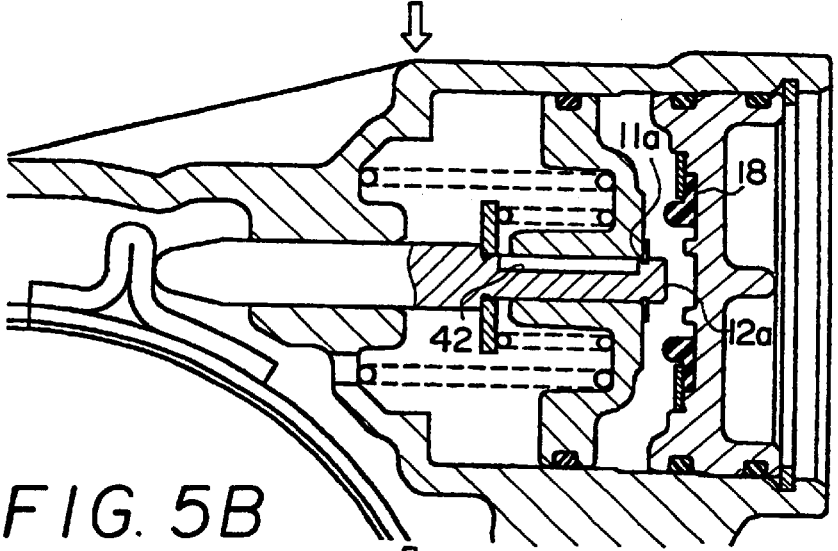
Figure 5C:
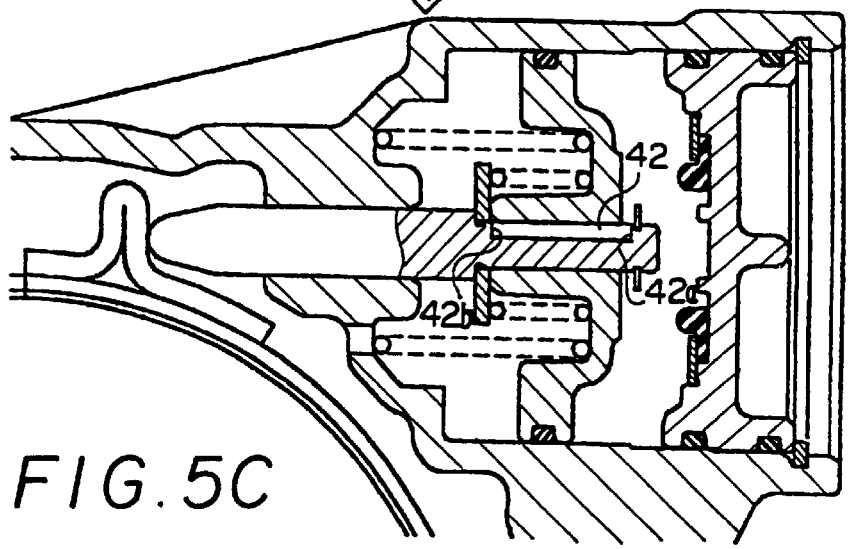

FIG. 5 shows a second embodiment of the invention in its various operational states. In this embodiment, the passage 4 is opened and closed by the relative movement between the piston 11 and the rod 12. The passage 4 is formed in the rod 12 as in the first embodiment. But, in this embodiment, the passage 4 is formed as a groove 42 on the outer surface of the rod 12 to simplify the manufacturing process. The groove 42 extends through and is longer than the length traversed by the piston 11 in movement relative to the rod 12. Specifically, one end 42a of the groove 42 ends just is before the snap ring 16, the other end 42b ends just before the spring seat 15, and the groove 42 is longer than the hole which extends through the piston 11 and which receives the rod 12. Therefore, the ends 42a and 42b of the groove 42 open in the radial direction as they are uncovered by the piston 11. As a result, the air is exhausted in the short time of transition from the position shown in FIG. 5B (middle range) to the position shown in FIG. 5C (lower range).

Prevention of reentry of the air into the hydraulic chamber A during the return stroke, upon release of the brake, is provided for by the seal member 18 as an auxiliary closer, the same as in the first embodiment. The closer for the passage itself is a portion 11a of the piston 11 which overlaps end 42a of groove 42.

In this embodiment, the passage 4 is opened and closed by the relative movement between the piston 11 and the rod 12. Therefore, the time in which the air is exhausted is relatively short as compared to the time of the stroke. As a result, the loss of the application pressure during fastening of the brake is minimized. Therefore, this embodiment is suitable for a hydraulic servo apparatus in which little air is accumulated in the hydraulic chamber A.

Figure 6A:
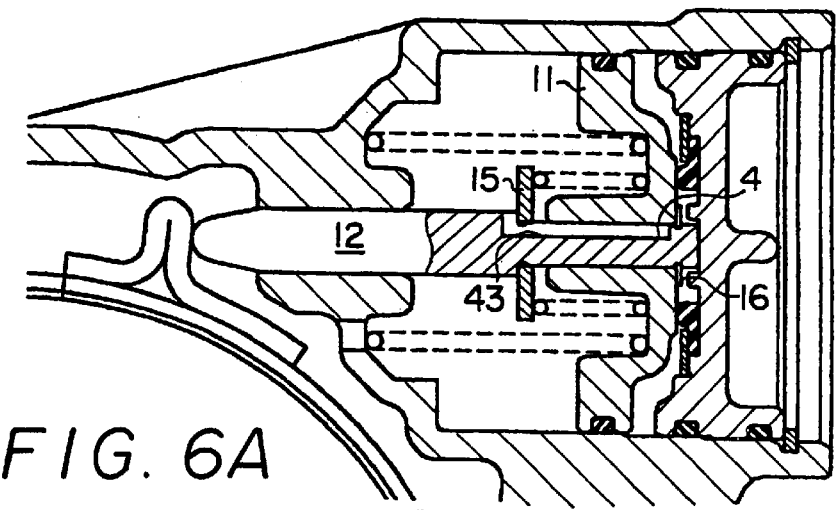
FIGS. 6A–6C are a sequence of figures showing operation of a hydraulic servo apparatus according to a third embodiment of the present invention.
Figure 6B:
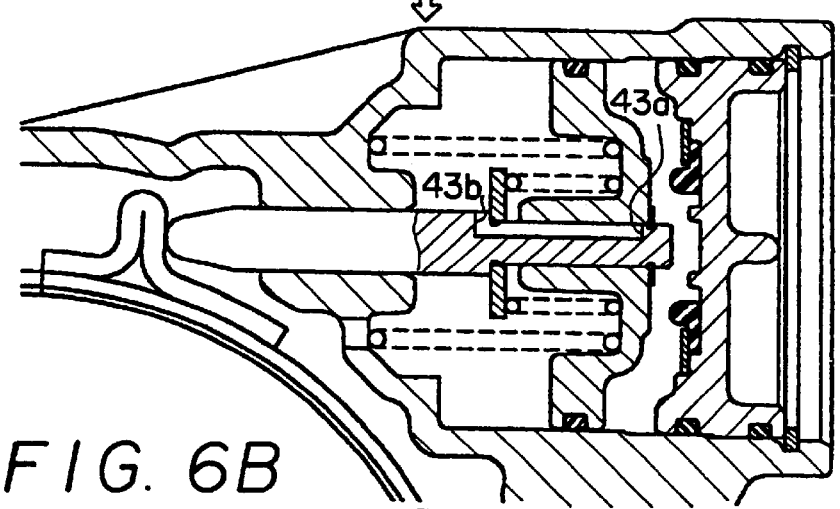
Figure 6C:
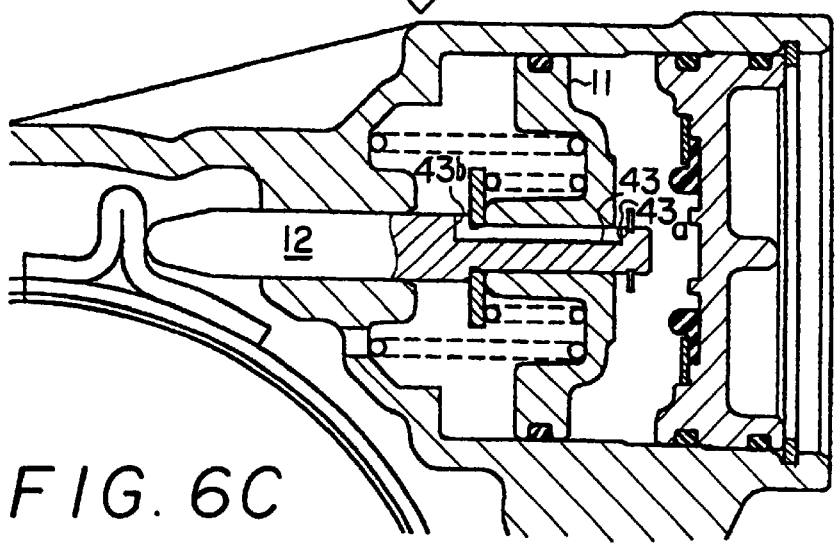

FIG. 6 shows a third embodiment of the invention. In this embodiment, the air is exhausted after completion of the strokes of the piston 11 and the rod 12. The passage 4 is formed as an axially extending groove 43 on the outer surface of the rod 12, as in the second embodiment. The groove 43 terminates at one end 43a within the area of the movement of the piston 11 relative to the rod 12, and the other end 43b is located beyond the area of the relative movement. Specifically, the one end 43a is located just before the snap ring 16, and the other end 43b is located at a position beyond the spring seat 15. Therefore, as shown in FIG. 6C, both ends 43a and 43b of the groove 43 are open (uncovered) after the piston 11 moves relative to the rod 12. As a result, the air is continuously exhausted while the brake is engaging.

In this third embodiment, the loss of the hydraulic pressure is increased because the air is exhausted throughout the period of time during which the brake is fastening. But, exhaust of the air is absolutely assured even in the case of a hydraulic servo having a capacity to entrap large volumes of air. Further, it prevents reentry of the air into the hydraulic chamber during the return stroke, upon release of the brake, as in the second embodiment.

The teachings of Japanese Application Serial Number H10-075036, filed Mar. 10, 1998, inclusive of its specification, claims and drawings, are hereby incorporated herein by reference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic servo apparatus for engaging/disengaging a frictional engagement element in an automatic transmission including a case defining an interior space in which the hydraulic servo apparatus is mounted, said hydraulic servo apparatus comprising:

a cylinder having an inner space which, at one end, is adapted for connected to the interior space of the case of the automatic transmission;

a piston slidably mounted in the cylinder and dividing the inner space of the cylinder into a closed hydraulic chamber and a back chamber connected to the interior space of the case of the automatic transmission, said piston being moved in a first direction toward said back chamber by application of a hydraulic pressure to the hydraulic chamber;

a rod slidably mounted in the piston for sliding movement relative to the piston over a predetermined distance, said rod being extended from the one end of the cylinder and adapted to press the frictional engagement element into engagement by the movement of said piston in said first direction;

a passage formed between the piston and the rod and connecting the hydraulic chamber to the back chamber, said passage being opened/closed by the relative movement between the piston and the rod; and a closer which closes said passage at the completion of a return stroke of the piston in a second direction toward said hydraulic chamber.

2. The hydraulic servo apparatus according to claim 1 further comprising:

a return spring which is mounted in the back chamber and which urges said piston in said second direction; and a regulating spring which is arranged between the piston and the rod for regulating the relative movement therebetween;

wherein timing of the relative movement between the piston and the rod is determined by a difference between loads of the return spring and the regulating spring.

3. The hydraulic servo apparatus according to claim 2, wherein said passage is formed in the rod, with one end of the passage opening at said contact face of the rod and a second end of the passage opening at the periphery of the rod, said second end of the passage being opened/closed by the relative movement between the rod and the piston.

4. The hydraulic servo apparatus according to claim 1, wherein timing of the relative movement between the piston and the rod is determined at least in part by the shape of the passage.

5. The hydraulic servo apparatus according to claim 4, wherein said passage is formed in the rod and has opposing end openings on the periphery of the rod, which end openings are opened at same time during the relative movement between the piston and the rod.

6. The hydraulic servo apparatus according to claim 4, wherein said passage is formed in the rod, one end of said passage being opened/closed by the relative movement between the piston and the rod, and a second end of said passage remaining open to the back chamber at all times.

7. The hydraulic servo apparatus according to claim 1, wherein said passage is formed in the rod, said passage having one end opening at an end face of the rod and a second opening at the periphery of the rod, said second opening being opened/closed by the relative movement between the rod and the piston.

8. The hydraulic servo apparatus according to claim 1, wherein said passage is formed with peripheral openings at the periphery of the rod, said peripheral openings being opened at the same time by the relative movement between the piston and the rod.

9. The hydraulic servo apparatus according to claim 1, wherein said passage is formed in the rod, said passage having a first opening which is opened/closed by the relative movement between the piston and the rod, and a second opening which remains open to said back chamber at all times.

10. A hydraulic servo apparatus for engaging/disengaging a frictional engagement element in an automatic transmission including a case defining an interior space in which the hydraulic servo apparatus is mounted, said hydraulic servo apparatus comprising:

a cylinder having an inner space which, at one end, is adapted for connection to the interior space of the case of the automatic transmission;

a piston slidably mounted in the cylinder and dividing the inner space of the cylinder into a closed hydraulic chamber and a back chamber connected to the interior space of the case of the automatic transmission, said piston being moved in a first direction toward said back chamber by application of a hydraulic pressure to the hydraulic chamber;

a rod slidably mounted in the piston for sliding movement relative to the piston over a predetermined distance, said rod being extended from the one end of the cylinder and adapted to press the frictional engagement element into engagement by the movement of said piston in said first direction;

a passage formed between the piston and the rod and connecting the hydraulic chamber to the back chamber, said passage being opened/closed by the relative movement between the piston and the a return spring which is mounted in the back chamber and which urges said piston in a second direction; and a regulating spring which is arranged between the piston and the rod for regulating the relative movement therebetween;

wherein timing of the relative movement between the piston and the rod is determined by a difference between loads of the return spring and the regulating spring; and wherein said rod has a contact face which comes into contact with an end face of the hydraulic chamber at the completion of the return stroke of the piston, said passage being closed by the contact between said contact face and said end face.

11. The hydraulic servo apparatus according to claim 10, further comprising: a seal member which is arranged on said end face for contact with said piston at the completion of return stroke.

12. The hydraulic servo apparatus for engaging/disengaging a frictional engagement element in an automatic transmission including a case defining an interior space in which the hydraulic servo apparatus is mounted, said hydraulic servo apparatus comprising:

a cylinder having an inner space which, at one end, is adapted for connection to the interior space of the case of the automatic transmission;

a piston slidably mounted in the cylinder and dividing the inner space of the cylinder into a closed hydraulic chamber and a back chamber connected to the interior space of the case of the automatic transmission, said piston being moved in a first direction toward said back chamber by application of a hydraulic pressure to the hydraulic chamber;

a rod slidably mounted in the piston for sliding movement relative to the piston over a predetermined distance, said rod being extended from the one end of the cylinder and adapted to press the frictional engagement element into engagement by the movement of said piston in said first direction; and a passage formed between the piston and the rod and connecting the hydraulic chamber to the back chamber, said passage being opened/closed by the relative movement between the piston and the rod;

wherein timing of the relative movement between the piston and the rod is determined at least in part by the shape of the passage; and wherein said rod has a contact face which comes into contact with an end face of the hydraulic chamber at the completion of the return stroke of the piston, said passage being closed by the contact between said contact face and said end face.

* * * * *

UNITED STATES PATENT AND TRADEMARK OFFICE
CERTIFICATE OF CORRECTION

PATENT NO. : 6,220,402 B1
DATED : April 24, 2001
INVENTOR(S) : Tsutsui et al.

It is certified that error appears in the above-identified patent and that said Letters Patent is hereby corrected as shown below:

Column 1,
Line 6, "separates" should read -- operates --.

Column 2,
Line 15, "A" should read -- An --.

Column 5,
Line 30, "tively" should read -- tive --.

Column 6,
Line 26, "17.." should read -- 17. --;
Line 48, "12" (1st occurrence) should read -- 11 --; and
Line 50, "12" should read -- 11 --.

Column 8,
Line 19, "connected" should read -- connection --.

Column 9,
Line 51, after "and the" insert -- rod --.

Signed and Sealed this

Ninth Day of July, 2002

*Attest:*

*Attesting Officer*

JAMES E. ROGAN
*Director of the United States Patent and Trademark Office*